United States Patent
Gao et al.

(10) Patent No.: US 10,740,346 B2
(45) Date of Patent: Aug. 11, 2020

(54) SYSTEM AND METHOD FOR AUTOMATING INFORMATION HANDOVER FROM FACILITY PROJECT TO OPERATIONS/MAINTENANCE

(71) Applicant: AGILE HANDOVER AND AUTOMATION SOLUTIONS, LLC, Downingtown, PA (US)

(72) Inventors: Hong Gao, Downingtown, PA (US); Sen Zhang, Niskayuna, NY (US); Jeff Nolan, Strasburg, VA (US)

(73) Assignee: Agile Handover and Automation Solutions, LLC, Downingtown, PA (US)

( * ) Notice: Subject to any disclaimer, the term of this patent is extended or adjusted under 35 U.S.C. 154(b) by 107 days.

(21) Appl. No.: 15/706,827

(22) Filed: Sep. 18, 2017

(65) Prior Publication Data
US 2019/0087473 A1    Mar. 21, 2019

(51) Int. Cl.
*G06F 16/25*    (2019.01)
*G06F 16/21*    (2019.01)

(52) U.S. Cl.
CPC .......... *G06F 16/254* (2019.01); *G06F 16/213* (2019.01)

(58) Field of Classification Search
CPC .................................................. G06F 16/254
USPC ......................................................... 707/602
See application file for complete search history.

(56) References Cited

U.S. PATENT DOCUMENTS

| | | | |
|---|---|---|---|
| 7,877,421 B2 * | 1/2011 | Berger ................. | G06F 16/288 707/809 |
| 10,216,814 B2 * | 2/2019 | Allan ..................... | G06F 8/433 |
| 2010/0280962 A1 * | 11/2010 | Chan ..................... | G06Q 10/10 705/301 |
| 2011/0004622 A1 * | 1/2011 | Marson ................. | G06Q 10/06 707/770 |
| 2015/0095298 A1 | 4/2015 | Mann | |
| 2017/0147717 A1 * | 5/2017 | Chen .................. | G06F 17/5004 |
| 2018/0074786 A1 * | 3/2018 | Oberbreckling ......... | G06F 7/02 |
| 2018/0232459 A1 * | 8/2018 | Park .................... | G05D 23/1931 |

* cited by examiner

*Primary Examiner* — Sheree N Brown
(74) *Attorney, Agent, or Firm* — Panitch Schwarze Belisario & Nadel LLP

(57) ABSTRACT

In one embodiment, a technique is provided for automating handover information from project (construction & design) to operation/maintenance. A schema-less repository is defined for holding handover asset objects and governing transformation automation. An information stitching method is defined for multiple-sourced project data integration and incorporating owners' requirement into the repository. A 2-step script-based transformation process is provided to encapsulate information modeling knowledge from a transformation definition.

1 Claim, 8 Drawing Sheets

A typical use of the system

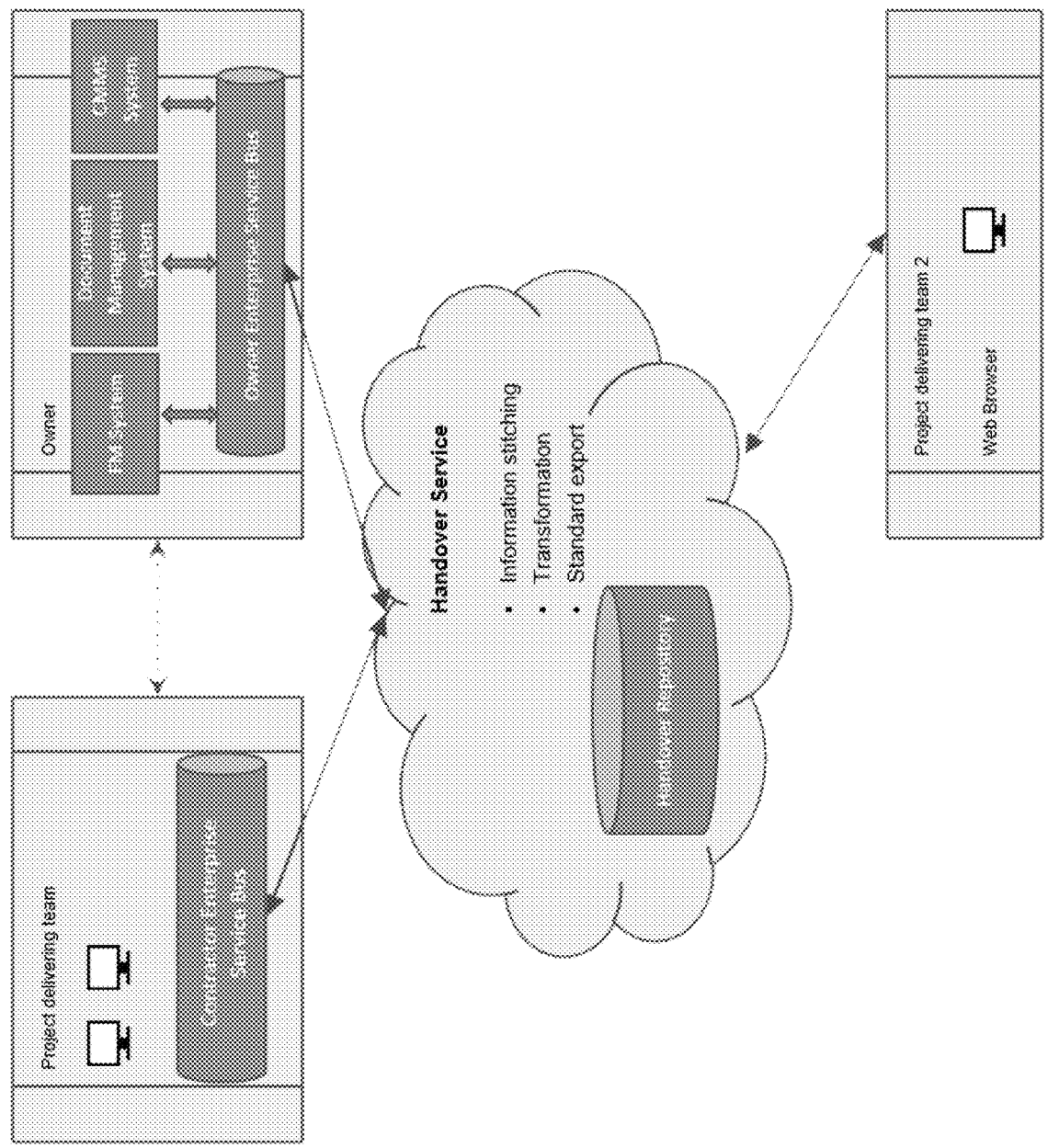
Fig 1 A typical use of the system

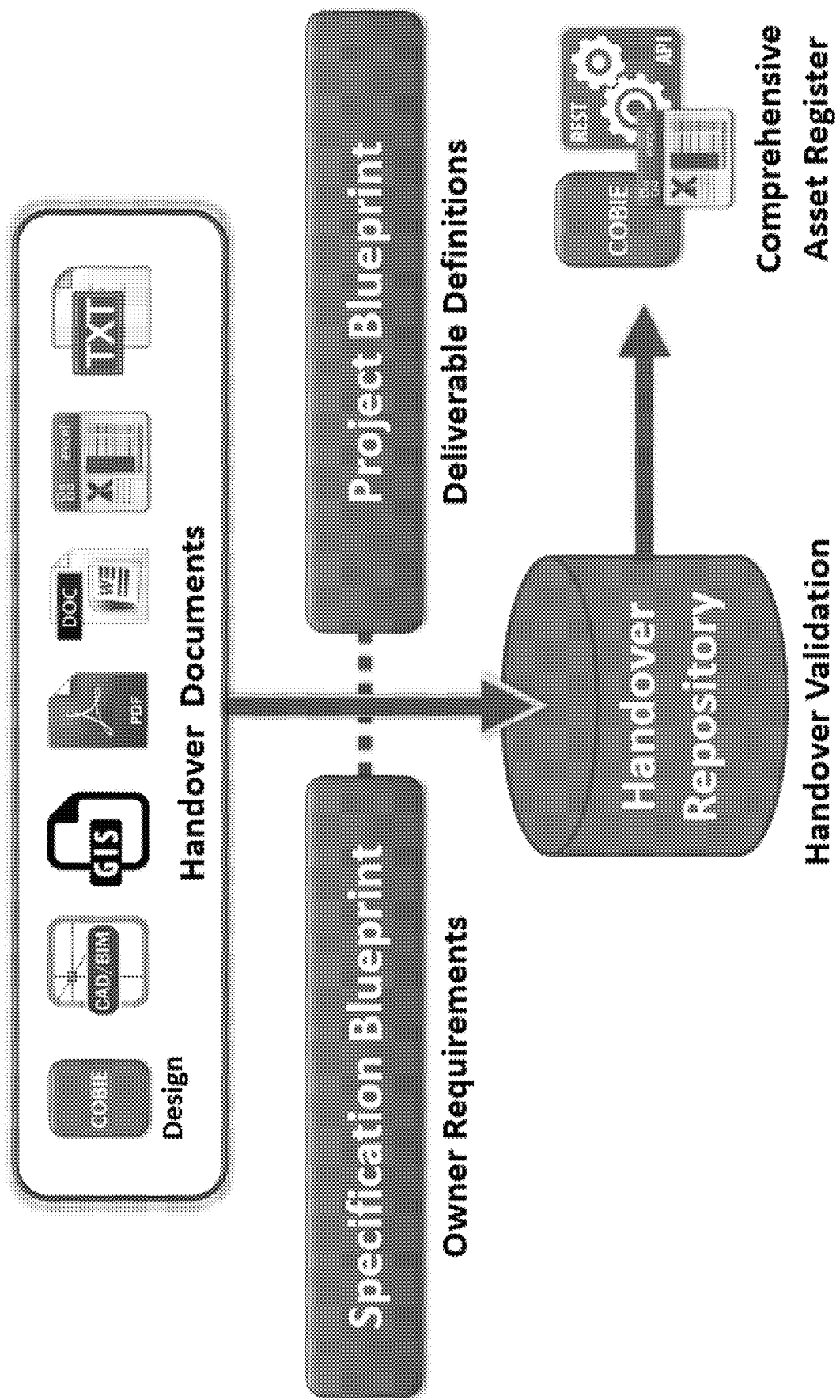
Fig 2 System components

Current Selection remove all
(×) Handover:Component
(×) Type:"Fan Coil Unit"

Location
  ÷ Simple Bldg (21)

Category
[Component]

Asset Type
Missing
[Fan Coil Unit (21)]

System
[Mechanical]

Zone
[Central] [North] [South]

[          ] Advanced

FCU-100-01
Fan Coil Unit|*Mechanical*
Documents Details

FCU-101-01
Fan Coil Unit|*Mechanical*
Documents Details

FCU-103-01
Fan Coil Unit|*Mechanical*
Documents Details

FCU-104-01
Fan Coil Unit|*Mechanical*
Documents Details

FCU-105-01
Fan Coil Unit|*Mechanical*
Documents Details

FCU-106-01
Fan Coil Unit|*Mechanical*
Documents Details

Fig 3 A visual representation of Handover Repository

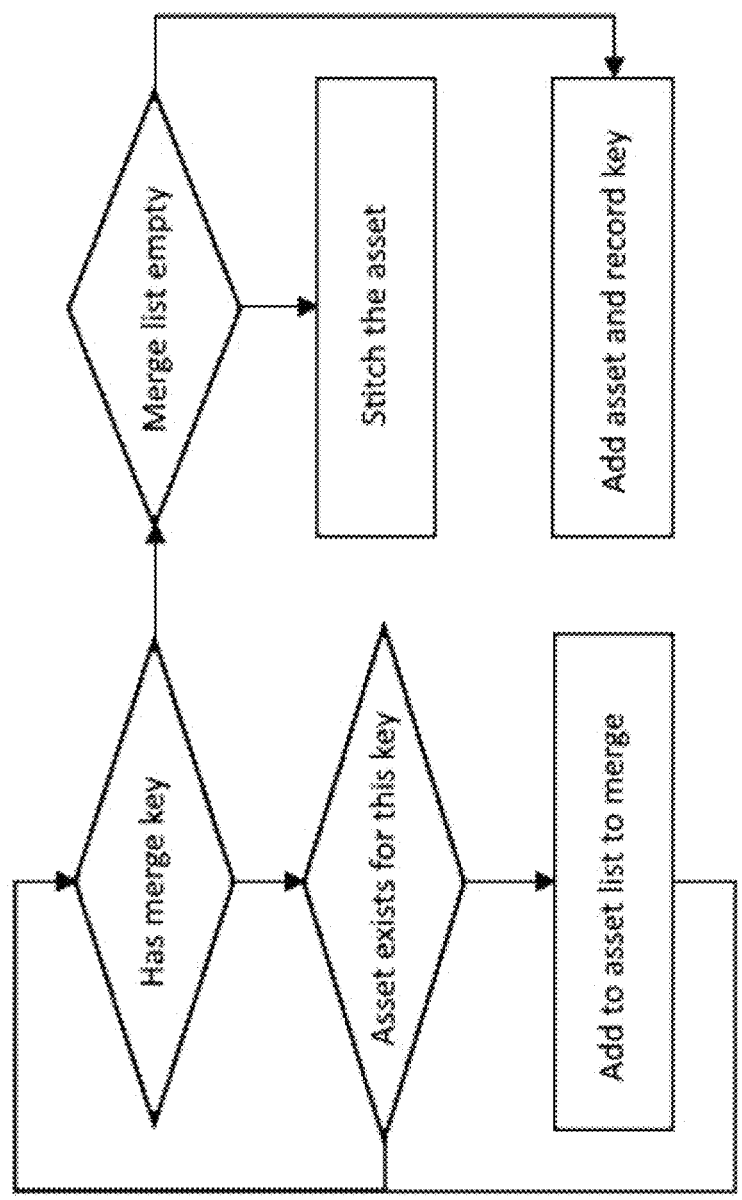
Fig 4 Information Stitching algorithm

Transformation

```
Facility: Medical Building 101-8 ";
 Name=fl.getParameter('AssetId').toString();
var PDF=efl.getParameter('FileName');
var CAD=PDF.replaceAll('.pdf','.dwg');
var FileOnly=PDF.replaceAll('.pdf','');

// The following code assigns floor to the component by removing the last three characters in the string (assumes 4 or 5 character space names).
var firstDotPos = PDF.indexOf('.');
//check if it is the . before .pdf
if (firstDotPos>0)
if ( PDF.indexOf(',pdf) != firstDotPos )
{
    var pdfLen=PDF.length();
    Zone=PDF.substring(firstDotPos+1, firstDotPos+2);
    Floor = PDF.substring(firstDotPos-2, firstDotPos);
    System=PDF.substring(0, firstDotPos-4);
}

// The following code creates asset types from component text strings by assigning type based on the next that precedes the first hyphen in the string.
var i=Name.indexOf('-');
if (i>=0) {
    TypeName=Name.substring(0,i);
}

//use only space on the current floor
var temp;
if (efl.getParameter('HandoverCategory')== 'Space')
{
    if (Name.indexOf(Floor)!=0) {
        temp='0'+Name;
        if (temp.indexOf(Floor)!=0)
            _skipRecord=true;
    }
    Space = Name;
    Refs: Docs: [{Name:'FileOnly+' Record Sheet','Category:'Record','File:' PDF,'_PrimaryFields':[Name','Category']},{Name:'FileOnly+' Source Sheet
}
else
    Refs: Type:{Name:'TypeName'},Docs:[{Name:'FileOnly+' Record Sheet','Category:'Record','File:' PDF,'_PrimaryFields':[Name','Category']},
    [Name','Category']}];
```

Fig 5 An example defining transformation step 1

Fig 6 An example of transformation step 2

Fig 7 An example attaching owner's specification to assets

Owner's View

General | Specification | Advanced

UNIFORMAT II - Maxir ▼

- BAS
- D10 Conveying
- D2010 Plumbing Fixtures
- D2020 Domestic Water Distribution
- D2030 Sanitary Waste
- D3010 Energy Supply
- D3020 Heat Generating Systems
- D3030 Cooling Generating Systems
- D3040 Distribution
- D5010 Electrical Service and Distribution
- D5020 Lighting and Branch Wiring
- D5030 Communications and Security
  - AccessControlPanel
- D5090 Other Electrical Systems
- SBR Space

Attributes | Submittals

Applicable to: UNIFORM ▼

D5030 Communications and Security\AccessControlPanel

Status: Edit

| Name | Type | Unit | Record at | Validate at |
|---|---|---|---|---|
| Equipment ID | String | | Design | Construction, Commissioning |
| Location | String | Room # (bldg#-room ex. 000X ) | Design | Construction, Commissioning |
| Installation Date | Date Time | | Construction | Commissioning |
| Warranty Date | Date Time | | Construction | Commissioning |
| Manufacturer | String | | Construction | Commissioning |
| Model # | String | | Construction | Commissioning |
| Source Breaker Number(s) | Number | # | Construction | Commissioning |
| Source Power Panel Name | Number | Panel Name | Construction | Commissioning |

Fig 8 Defining owner's specification

SYSTEM AND METHOD FOR AUTOMATING INFORMATION HANDOVER FROM FACILITY PROJECT TO OPERATIONS/MAINTENANCE

BACKGROUND

Technical Field

The present disclosure relates generally to information ETL (extraction, transformation and load) technologies, and more specifically to techniques for extracting, transforming and loading engineering and construction project information to operating and maintenance systems.

Background Information

Handover is one of the areas identified in capital project industry that could help reduce interoperability cost. The Dow Chemical Company estimates that facility handover and transition costs are 30% of the original capital cost [Fiatech 2016]. Improvement of handover efficiency would significantly reduce overall cost and increase the profit margin of the industry. This invention applies ETL concept to automate the handover process.

ETL technologies have been used widely in data warehouses and information system integrations. Conceptually, getting asset information from project data into operation system is a process of extraction, transformation and load. Yet general ETL technologies are hard to use in this area because of the complexity and uniqueness of project (design and construction) information. The major aspects of project information that hinder the use of general ETL technologies are: 1) Large amount of unstructured information. Many data needed in O/M are stored or delivered in PDF files, which is known very hard to extract. 2) Data from multiple sources are loosely related. A common schema is hard to define, which is normally needed for general ETL technologies 3) Information modeling gap between design/construction and O/M is too broad for ETL tools to apply. While the project data is usually loosely related and less structured, the O/M information tends to be structured and simple 4) Operation/Maintenance requirements (Owner's specification) are different from owner to owner. The uniqueness of target systems may require deep reconfiguration of an ETL solution for each project, which is often not economically practical.

Accordingly, there is a need for a special ETL technique for automating handovers data from project (design and construction) to operations.

SUMMARY

According to one embodiment of the present disclosure, handover information is managed by a schema-less building information model—Handover Repository. This schema-less information model is the core in this method, upon which special ETL techniques are applied. The transformation process is a 2-step script-based process in this method. The first step is from project data to a semi-normalized Handover Repository. The second step is from Handover Repository to owner's specification. Unlike in general ETL technologies, transformation in this method focuses on facility information model in Handover Repository and therefore information modeling knowledge is not required to manage the transformation. The major technique for transformation is disclosed as the Information Stitching technology. Further, the load process, which is an export from Handover Repository, is through building information exchange standard like COBie (Construction Operations Building information exchange) and standard web programming API (application programming interface). Therefore, the schema-less Handover Repository, the Information Stitching technology, the 2-step script-based transformation method and standard export of owner required information distinguish this method from general ETL technologies.

An example schema-less Handover Repository may be a MongoDB database which can hold attributes for handover documents, components, types, locations and the relationships among these assets. The assets in this repository can have any attributes without pre-defining them. Although the asset information is schema-less, there is a defined information model governing the repository for automation. The built-in attributes for assets in this model are: HandoverCategory, Name, Location (Facility, Floor, Space, and Zone), TypeName, and System. Relationships are modeled as references. For example, if a component belongs to a system, the component object in the repository would have a reference to the system object.

An example use of Information Stitching technology may be to stitch information from construction like a door schedule to design data of the door using door names or locations. These information come from different sources, different phases of a project and possibly in different format. Information Stitching technology ensures information on the same asset grouped together. The technology is to deal with loosely-related project information, where a schema is hard to predefine.

An example of transformation script may be in JavaScript. Objects and Macros are defined based on COBie (Construction Operations Building information exchange). These objects and macros encapsulate information modeling knowledge. Using these designed JavaScript objects and standard JavaScript functions, engineers can transform project data into an owner's specifications and normalize terms.

Various other techniques, adaptations of techniques, and the like, may also and/or alternatively be employed, and this summary is merely provided as an illustrative example.

BRIEF DESCRIPTION OF THE DRAWINGS

The detailed description below refers to the accompanying drawings, of which:

FIG. 1 is a schematic block diagram of an example computer system including an example computer (e.g., a web browser) interconnected to a server, in which at least some of the presently described techniques may be employed;

FIG. 2 is an abstract diagram of components in the system that may be utilized to extract project data, stitch them together, and transform them into operation view;

FIG. 3 is a visual representation of the schema-less Handover Repository that shows the required attributes for automation and the organization of the schema-less attributes;

FIG. 4 is a diagram of the Information Stitching algorithm;

FIG. 5 is a script sample that shows Step 1 of the 2-step transformation method.

FIG. 6 is a script sample that shows Step 2 of the 2-step transformation method.

FIG. 7 is a diagram of attaching owner's specification to specific assets.

FIG. 8 is a diagram of defining owner's specification.

DETAILED DESCRIPTION

FIG. 1 is a schematic block diagram of an example computer system including an example computer (e.g., a web browser) interconnected to a server in the cloud, in which at least some of the presently described techniques may be employed. This diagram shows the interfaces that the handover service uses to interact with existing systems.

The center is the service where the handover repository sits. This service stitches, and transforms asset information from project data into handover repository. Handover data could be pulled from or pushed into the system via Restful APIs (Application Programing Interface). The handover data could also be consumed via a browser. Further more, standard format, like COBie (Construction Operation Building information exchange), could be used for handover information exchange.

FIG. 2 is an abstract diagram of components in the system that may be utilized to extract project data, stitch them together, and transform them into operation view.

Specification Blueprint (also termed as owner's specification in this application) is a target definition defining the view to transform to. Usually the definition can be drawn from existing systems. This component implements a tool to model the information for a transformation target, which could be for operation or maintenance.

Project Blueprint is a definition of project data. This component implements a tool to model the types of source data in a project. Step 1 of the 2-step transformation is defined in this component.

Handover repository defines a schema-less data model to transform the project data into targeted view. Step 2 of the 2-step transformation is defined and performed in Handover Repository.

FIG. 3 is a visual representation of the Handover Repository. On the left, the predefined attributes are listed: HandoverCategory, Location, Type, System and Zone. On the right, assets extracted from project data are listed. The details of an asset shows the stitched information from multiple sources for this asset. Documents of an asset are also listed in the repository. Operations could be applied to the repository: search, slice and dice. Search could be applied to both source attributes and owner defined output attributes.

FIG. 4 is a diagram of the Information Stitching algorithm. The algorithm stitches information of a single asset from multiple sources into Handover Repository. In the design build process, it is very likely the information about a piece of asset comes from multiple sources in an arbitrary order. When a new asset is found in the project data, it will be classified and assigned location information in the transformation step 1. As other information coming in, they get stitched to the existing asset. This asset information stitching algorithm guarantees the same merge result regardless of the process order.

As there may not be common fields across all the data sources in a project, the concept of Merge Keys is used for stitching. Merge Keys is set of keys common in any two of the data sources. The stitching algorithm stitches all the data sources together as long as they are loosely connected via Merge Keys. An asset may have multiple set of Merge Keys. During information stitching process, each set is checked and managed to identify targeted asset to merge. Here is an example:

Assuming an asset type A has 3 set of Merge Keys {{K1, K2}, {KK1}, {KKK1, KKK2}}, information pieces about A comes from 4 sources—s1 (K1, K2), s2 (KK1), s3 (KKK1, KKK2, K1, K2), s4 (KK1, K1, K2).

As an illustration example, the information are processed in the order of s1, s2, s3, and s4. Initially when s1 is processed, no asset is found in the repository. All the Merge Keys are stored for later check. When s2 is processed, the asset information is treated as for a different asset because no merge key overlap with s1. When s3 is process, the information from s3 is merged into asset record generated from s1. When s4 is processed, record from s1 and s2 get stitched together with information from s4.

This algorithm would produce the same result regardless of the processing order of the sources.

FIG. 5 is an example script for Step 1 of the 2-step transformation. In Step 1, extracted asset information is classified and normalized with location, type, system, and zone. Other asset information will also be captured in a schema-less manner. Transformation and normalization is done through variable assignment. Script is used to control the logic how a transformation is done.

The highlighted variables in the script are those predefined by the Handover Repository—Location information (Facility, Floor, Space, and Zone), System information, and Type information. "_Refs" is used to define relationships. In the example, a space object will be related to Document objects, while others will be related to both Type and Document objects. Variable assignment to the non-predefined variables are treated as schema-less attributes.

Figure 6:
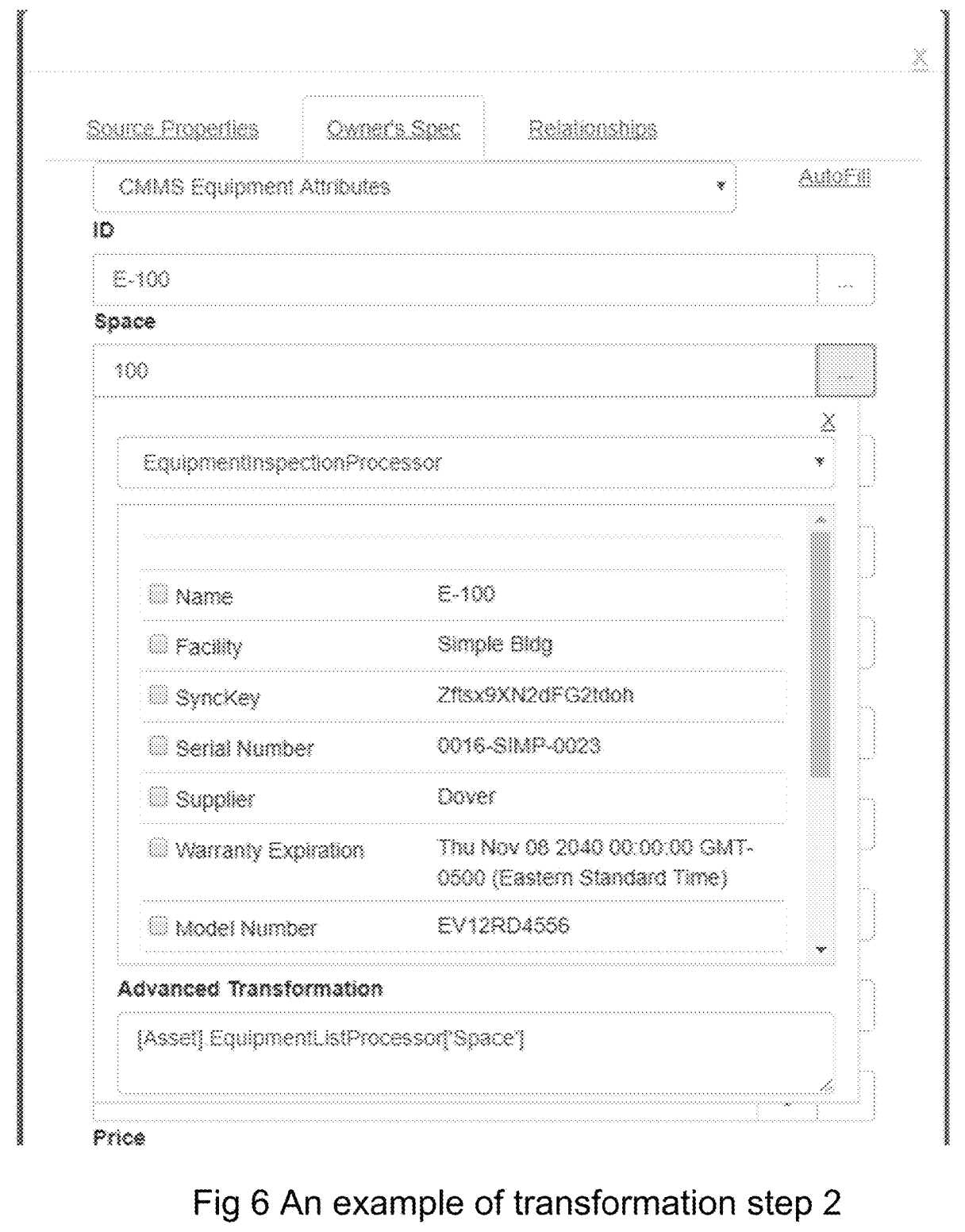

FIG. 6 is an example script for Step 2 of the 2-step transformation. In Step 2, stitched information are further transformed into owner's specification, which is the requirement for operation and maintenance.

An object model is designed to access the stitched information. Variable "[Asset]" is used to access the current asset object. Access further data sources is through property operator. For example: to access information from EquipmentInspectionProcessor of current asset, "[Asset].EquipmentInspectionProcessor" is used. Similarly, "Refs" and "RefBys" are used to navigate the relationships created during transformation Step 1. For example: "[Asset].Refs ['Facility']" refers to the facility where the current asset is located.

In the context of project handover, transformation occurs on 3 levels—classification transformation, attribute name transformation, and value transformation. Classification transformation is describe in FIG. 7. Attribute name transformation is through assignment of a value using this object model to the attribute in the owner specification as show in FIG. 6. Value transformation is used to bridge the gap between the different ways system and type are called in project and OM (Operation and Maintenance). Value transformations are done via Mappings. Mappings are variables defined within a Handover Repository and can accessed directly using "[ ]" operator. For example, if "SysMap" in the repository holds system name mappings between project and maintenance, "[SysMap]" is used to access that mapping. Value transformation is an application of script functions to these mapping variables.

Figure 7:
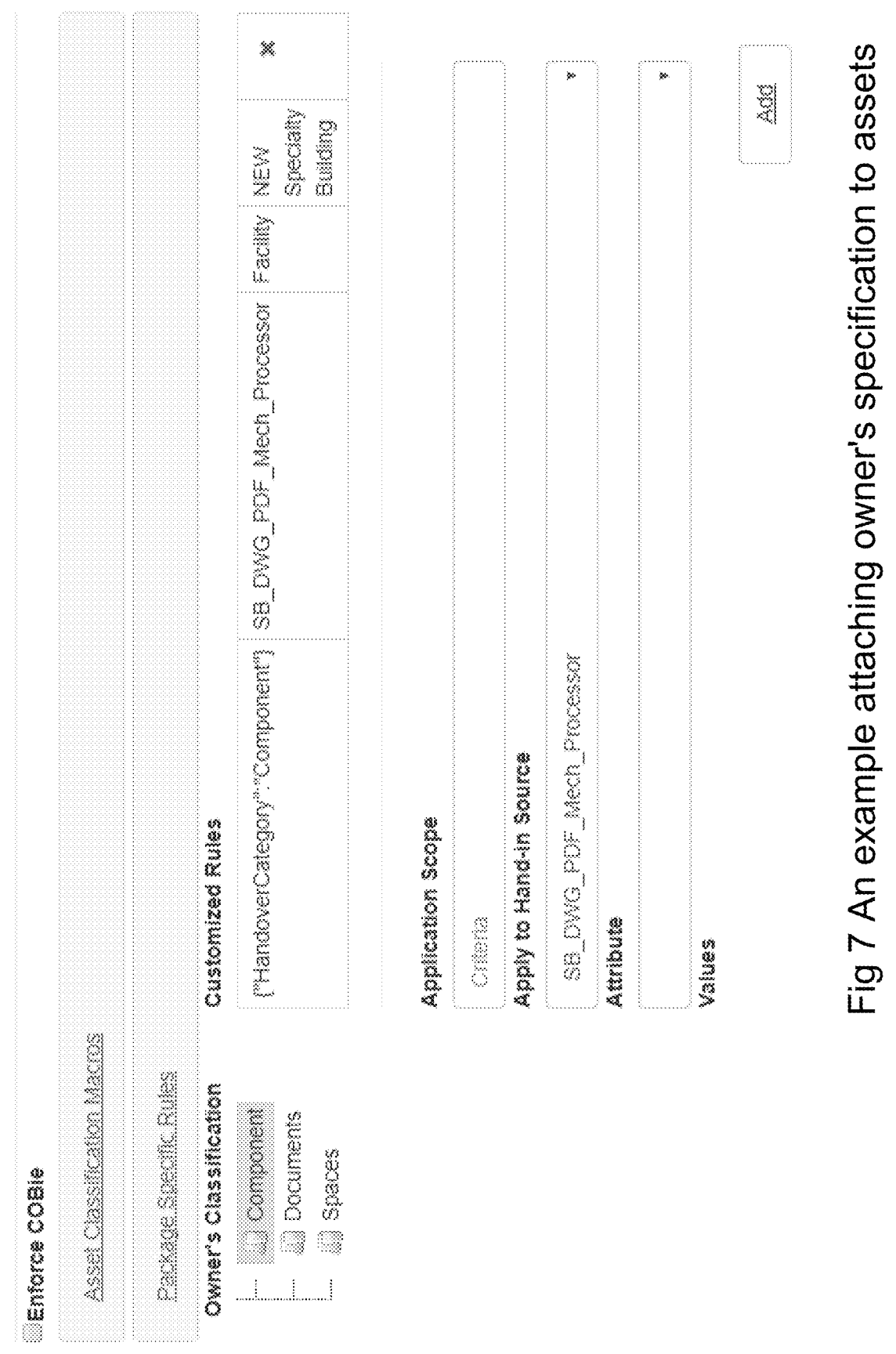

FIG. 7 is a diagram of attaching owner's specification to specific assets. Owner's specification is used to define the load information model, which is the target of the Step 2 of the transformation. Different asset may require different attributes to operate. For example, a wood door and an iron-automatic door will need different attributes to operate. Attaching owner's specification to specific asset effectively transformed the classification from project domain to OM domain.

This diagram shows how to apply precisely which attributes are required for each class of assets or instances. On the left is a list of required attribute group defined by the owner. On the right is a definition of which asset these groups are applicable to. The definition is implemented as a query definition to the schema-less handover repository. While a query definition is dictated by underlying schema-less database, this diagram shows all the necessary attributes in the query for attaching an owner's specification.

FIG. 8 is a diagram of defining owner's specification. This is a graphical representation of attributes definition of each asset class for OM purposes. It also defines type of documents needed for each asset class. On the left are the asset classes that an owner is interested in. On the right are the attributes and documents an owner need to operate and maintain this asset.

The diagram shows the areas an owner need to consider when defining a specification.

While the above description discusses various embodiments of the present disclosure, it should be apparent that a number of modifications and/or additions may be made without departing from the disclosure's intended spirit and scope.

For example, export implementation may support handover data exchange formats other than Excel, COBie and Restful API.

Further, it should be understood that many of the above-described techniques may be implemented in software as a native application, a cloud application, or in a combination thereof. They may be implemented using different programming languages and/or database systems. Accordingly, it should be understood that the above descriptions are meant to be taken only by way of example.

What is claimed is:

1. A method implemented by a computer system including a computer for automating information handover from project to operation and maintenance, the method comprising:
    (a) providing the following items for each data source in the project:
        (i) merge keys, wherein the merge keys is set of keys common in any two data sources in the project, and
        (ii) transformation script,
        wherein each data source includes asset information regarding assets in the project;
    (b) electronically stitching, by the computer, the asset information for each data source using the merge keys and the transformation script to create a schema-less building information model;
    (c) creating classification transformations of the asset information for the schema-less building information model using an owner's specification, the owner's specification being operation and maintenance requirements of the asset information;
    (d) creating attribute name transformations for the schema-less building information model using (i) the owner's specification, and (ii) an object model that accesses the asset information;
    (e) creating value transformations for the schema-less building information model using an object model that accesses the asset information;
    (f) electronically transforming, by the computer, the schema-less building information model into asset information by executing the attribute name transformations, the value transformations, and the classification transformations; and
    (g) exporting, by the computer, the asset information as a load into operation and maintenance systems.

* * * * *